United States Patent
Inoue et al.

(10) Patent No.: US 9,435,434 B2
(45) Date of Patent: Sep. 6, 2016

(54) CONTINUOUSLY VARIABLE TRANSMISSION AND CONTROL METHOD THEREFOR

(71) Applicants: JATCO LTD, Fuji-shi, Shizuoka (JP); NISSAN MOTOR CO., LTD., Yokohama-shi, Kanagawa (JP)

(72) Inventors: Mamiko Inoue, Ebina (JP); Hiroyasu Tanaka, Atsugi (JP); Takuichiro Inoue, Fujisawa (JP)

(73) Assignees: JATCO LTD, Fuji-Shi (JP); NISSAN MOTOR CO.,LTD., Yokohama-Shi (JP)

( * ) Notice: Subject to any disclaimer, the term of this patent is extended or adjusted under 35 U.S.C. 154(b) by 0 days.

(21) Appl. No.: 14/430,665

(22) PCT Filed: Sep. 3, 2013

(86) PCT No.: PCT/JP2013/073645
§ 371 (c)(1),
(2) Date: Mar. 24, 2015

(87) PCT Pub. No.: WO2014/050453
PCT Pub. Date: Apr. 3, 2014

(65) Prior Publication Data
US 2015/0252895 A1  Sep. 10, 2015

(30) Foreign Application Priority Data

Sep. 27, 2012 (JP) ................................ 2012-213939

(51) Int. Cl.
| | |
|---|---|
| *F16H 59/18* | (2006.01) |
| *F16H 61/662* | (2006.01) |
| *F16H 61/70* | (2006.01) |
| *F16H 37/02* | (2006.01) |
| *F16H 59/14* | (2006.01) |

(52) U.S. Cl.
CPC ...... *F16H 61/66259* (2013.01); *F16H 61/702* (2013.01); *F16H 59/141* (2013.01); *F16H 59/18* (2013.01); *F16H 61/6625* (2013.01);
(Continued)

(58) Field of Classification Search
CPC .......... F16H 61/6627; F16H 61/6625; F16H 61/66259; F16H 2061/66218; F16H 59/141; F16H 59/18; F16H 2059/183; F16H 2037/023; Y10T 477/6217; Y10T 477/623; Y10T 477/688; Y10T 477/692
See application file for complete search history.

(56) References Cited

U.S. PATENT DOCUMENTS

| | | | |
|---|---|---|---|
| 2010/0248875 A1 | 9/2010 | Jozaki et al. | |
| 2012/0143448 A1* | 6/2012 | Tohyama | F16H 61/12 701/51 |

(Continued)

FOREIGN PATENT DOCUMENTS

| | | |
|---|---|---|
| JP | 10-009379 | 1/1998 |
| JP | 2009-101823 | 5/2009 |
| JP | 2009-208751 | 9/2009 |
| JP | 2010-230117 | 10/2010 |

OTHER PUBLICATIONS

English translation of JP2009101823, http://translationportal.epo.org, May 11, 2016.*

*Primary Examiner* — Roger Pang
(74) *Attorney, Agent, or Firm* — Foley & Lardner LLP (57) ABSTRACT

A transmission controller determines whether or not to downshift a sub-transmission mechanism based on an opening and an opening speed of an accelerator pedal and a torque change rate of an engine, and downshifts the sub-transmission mechanism when a determination is made to downshift the sub-transmission mechanism.

4 Claims, 6 Drawing Sheets

(52) U.S. Cl.
CPC ... *F16H61/66227* (2013.01); *F16H 2037/023* (2013.01); *F16H 2059/147* (2013.01); *F16H 2059/183* (2013.01); *F16H 2061/66218* (2013.01); *Y10T 477/623* (2015.01); *Y10T 477/6217* (2015.01); *Y10T 477/688* (2015.01); *Y10T 477/692* (2015.01)

(56) References Cited

U.S. PATENT DOCUMENTS

2014/0342876 A1* 11/2014 Tanaka ............... F16H 61/04
 477/115
2015/0045183 A1* 2/2015 Aichi ............... F16H 59/18
 477/37

* cited by examiner

CONTINUOUSLY VARIABLE TRANSMISSION AND CONTROL METHOD THEREFOR

TECHNICAL FIELD

The present invention relates to a control of a continuously variable transmission with a sub-transmission mechanism.

BACKGROUND ART

JP2010-230117A discloses a technology of permitting a downshift of a sub-transmission mechanism only in a situation where a large drive force is required (an accelerator pedal opening is larger than a predetermined opening and a changing speed of the accelerator pedal opening is higher than a predetermined speed) in a continuously variable transmission with the sub-transmission mechanism.

Since a shift frequency of the sub-transmission mechanism decreases according to this technology, a reduction in drivability due to the repeated occurrence of a shift shock and a reduction in the durability of frictional engagement elements of the sub-transmission mechanism can be suppressed.

SUMMARY OF INVENTION

However, in the above technology, if an accelerator pedal is depressed at a speed higher than the predetermined speed after being depressed at a speed below the above predetermined speed until the accelerator pedal opening becomes larger than the above predetermined opening, there has been a possibility of the occurrence of a shift shock when the sub-transmission mechanism is downshifted.

This is for the following reason. In a region where the accelerator pedal opening is larger than the above predetermined opening, an engine torque changes to a small degree or hardly in some cases even if the accelerator pedal is further depressed since an engine torque approaches a maximum value. If the downshift of the sub-transmission mechanism is started in this case, a phenomenon in which the torque decreases due to an inertia of an engine occurs when a rotation speed of the engine is increased to a rotation speed after the shift and a so-called draw-shock (shock in a deceleration direction to lose a drive force) occurs.

The present invention aims to suppress a draw-shock in downshifting a sub-transmission mechanism in a continuously variable transmission with the sub-transmission mechanism.

One aspect of the present invention provides a continuously variable transmission with a variator capable of continuously changing a speed ratio and a stepped sub-transmission mechanism for shifting and outputting output rotation of a power source, and a control method corresponding to this. The continuously variable transmission includes a downshift determining unit for determining whether or not to downshift the sub-transmission mechanism based on an opening and an opening speed of an accelerator pedal, which is an output adjusting device of the power source, and a torque change rate of the power source, and a shifting unit for downshifting the sub-transmission mechanism when a determination is made to downshift the sub-transmission mechanism.

If the torque change rate of the power source is small, a phenomenon in which a torque decreases due to an inertia of the power source occurs in the case of downshifting the sub-transmission mechanism. Accordingly, if whether or not to downshift the sub-transmission mechanism is determined also considering the torque change rate of the power source as in the above aspect, the downshift of the sub-transmission mechanism can be prevented in a situation where a draw-shock occurs, whereby the occurrence of the draw-shock can be suppressed.

DESCRIPTION OF EMBODIMENT

Hereinafter, an embodiment of the present invention is described with reference to the accompanying drawings. It should be noted that, in the following description, a "speed ratio" of a certain transmission mechanism is a value obtained by dividing an input rotation speed of this transmission mechanism by an output rotation speed thereof. Further, a "lowest speed ratio" is a maximum speed ratio of this transmission mechanism and a "highest speed ratio" is a minimum speed ratio thereof.

Figure 1:
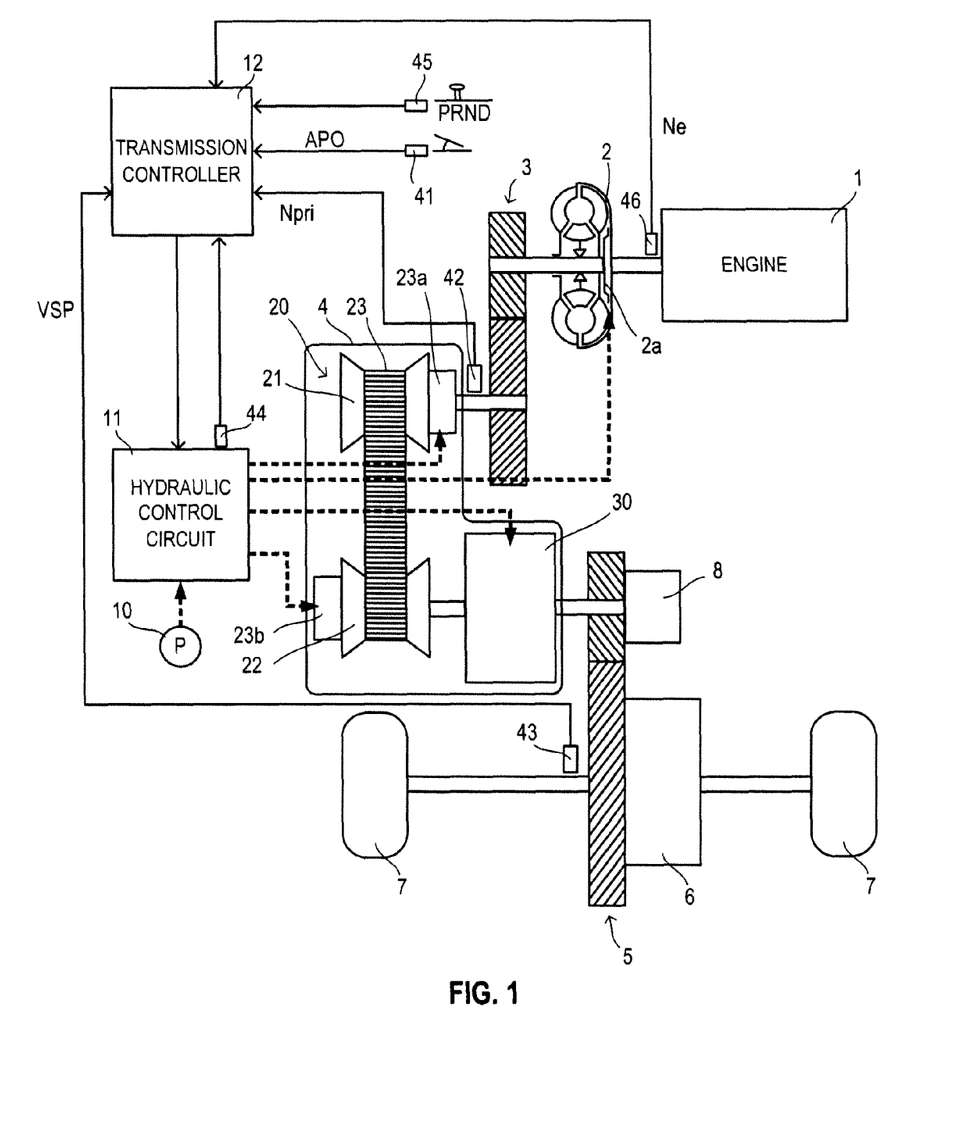
FIG. 1 is a schematic configuration diagram of a vehicle equipped with a continuously variable transmission according to an embodiment of the present invention.

FIG. 1 is a schematic configuration diagram of a vehicle equipped with a continuously variable transmission according to the embodiment of the present invention. This vehicle includes an engine 1 as a power source. Output rotation of the engine 1 is transmitted to drive wheels 7 via a torque converter 2, a first gear train 3, a transmission 4, a second gear train 5 and a differential device 6. The second gear train 5 includes a parking mechanism 8 for mechanically and unrotatably locking an output shaft of the transmission 4 in a parked state.

The torque converter 2 includes a lock-up clutch 2a. When the lock-up clutch 2a is engaged, there is no slip in the torque converter 2 and transmission efficiency of the torque converter 2 is improved.

Further, the vehicle is provided with an oil pump 10 to be driven using a part of power of the engine 1, a hydraulic control circuit 11 for adjusting a hydraulic pressure from the oil pump 10 and supplying the adjusted hydraulic pressure to each component of the transmission 4 and a transmission controller 12 for controlling the hydraulic control circuit 11.

The transmission 4 is a continuously variable transmission including a variator 20 and a sub-transmission mechanism 30 provided in series with the variator 20. "To be provided in series" means that the variator 20 and the sub-transmission mechanism 30 are provided in series in a power transmission path from the engine 1 to the drive wheels 7. The sub-transmission mechanism 30 may be directly connected to an output shaft of the variator 20 as in this example or may be connected via another transmission or power transmission mechanism (e.g. gear train). Alternatively, the sub-transmission mechanism 30 may be connected to the preceding stage (input shaft side) of the variator 20.

The variator 20 is a continuously variable transmission mechanism including a primary pulley 21, a secondary pulley 22 and a V-belt 23 mounted between the pulleys 21 and 22. Each of the pulleys 21, 22 includes a fixed conical plate, a movable conical plate arranged with a sheave surface faced toward the fixed conical plate and forming a V-groove between the fixed conical plate and the movable conical plate, and hydraulic cylinders 23a, 23b provided on the back surface of this movable conical plate for displacing the movable conical plate in an axial direction. When hydraulic pressures supplied to the hydraulic cylinders 23a, 23b are adjusted, the widths of the V-grooves change to change a contact radius of the V-belt 23 and each pulley 21, 22, whereby a speed ratio of the variator 20 continuously changes.

The sub-transmission mechanism 30 is a transmission mechanism with two forward speeds and one reverse speed and has a first gear position and a second gear position with a smaller speed ratio than in the first gear position as forward gear positions. In the following description, a case where the sub-transmission mechanism 30 is in the first gear position is expressed by that "the transmission 4 is in a low-speed mode" and a case where the sub-transmission mechanism 30 is in the second gear position is expressed by that "the transmission 4 is in a high-speed mode".

Figure 2:
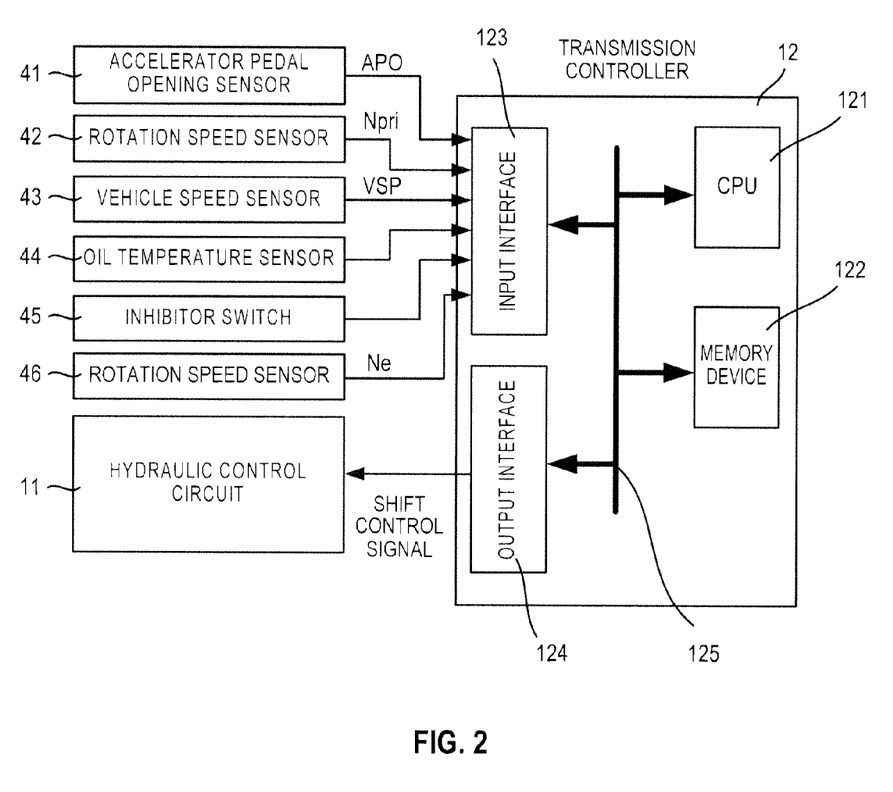
FIG. 2 is a diagram showing the internal configuration of a transmission controller.

The transmission controller 12 is, as shown in FIG. 2, configured by a CPU 121, a memory device 122 composed of a RAM and a ROM, an input interface 123, an output interface 124 and a bus 125 which connects these components to each other.

To the input interface 123 are input an output signal of an accelerator pedal opening sensor 41 for detecting an accelerator pedal opening APO indicating an operated amount of an accelerator pedal, an output signal of a rotation speed sensor 42 for detecting an input rotation speed of the transmission 4 (=rotation speed of the primary pulley 21, hereinafter, referred to as a "primary rotation speed Npri"), an output signal of a vehicle speed sensor 43 for detecting a vehicle speed VSP, an output signal of an oil temperature sensor 44 for detecting an oil temperature TMP of the transmission 4, an output signal of an inhibitor switch 45 for detecting the position of a select lever, an output signal of a rotation speed sensor 46 for detecting a rotation speed Ne of the engine 1 and the like.

A shift control program (FIG. 6) of the transmission 4 and various maps (FIGS. 3 to 5) used in this shift control program are stored in the memory device 122. The CPU 121 reads and executes the shift control program stored in the memory device 122, performs various computations on various signals input via the input interface 123 to generate a shift control signal, and outputs the generated shift control signal to the hydraulic control circuit 11 via the output interface 124. Various values used in the computations by the CPU 121 and computation results thereof are appropriately stored in the memory device 122.

The hydraulic control circuit 11 is composed of a plurality of flow passages and a plurality of hydraulic control valves. In accordance with the shift control signal from the transmission controller 12, the hydraulic control circuit 11 controls the plurality of hydraulic control valves to switch supply paths of the hydraulic pressure, prepares a necessary hydraulic pressure from a hydraulic pressure produced by the oil pump 10 and supplies this to each component of the transmission 4. In this way, the speed ratio of the variator 20 and the gear position of the sub-transmission mechanism 30 are changed and the lock-up clutch 2a is engaged and released.

Figure 3:
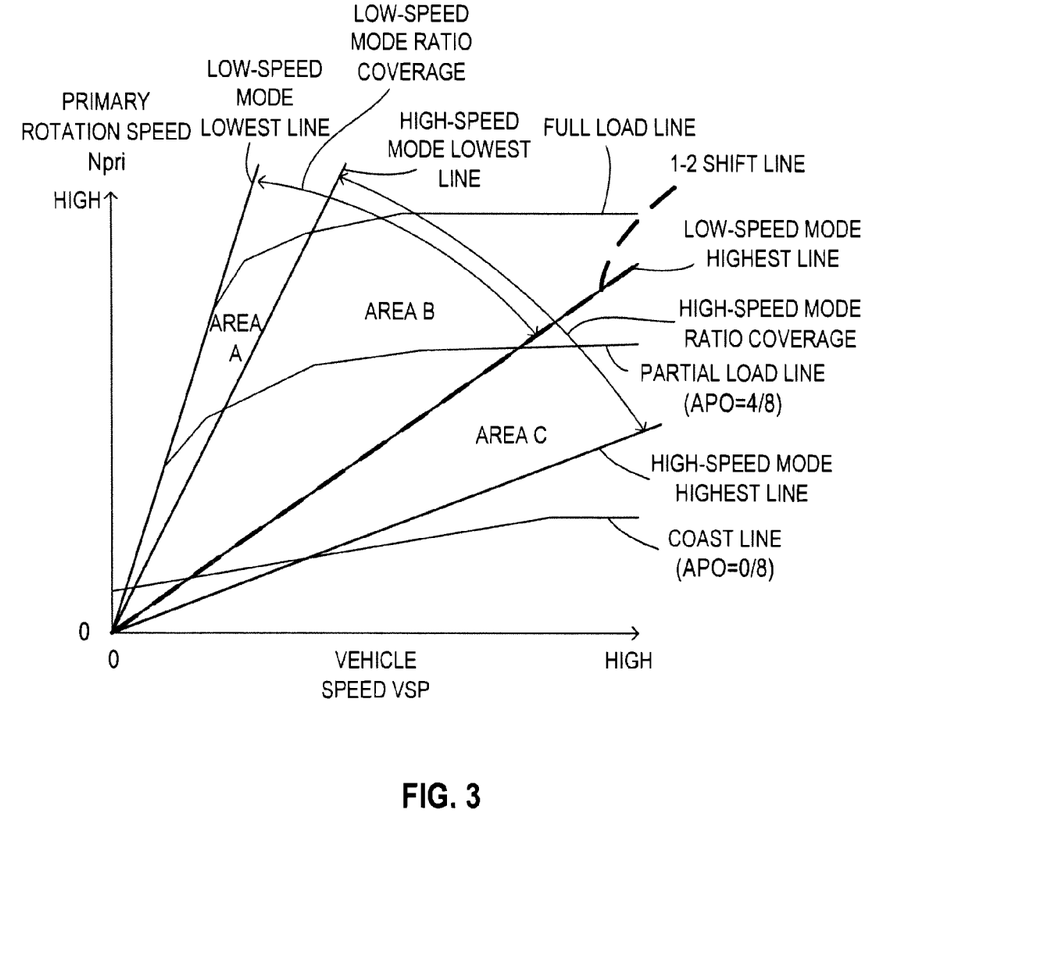
FIG. 3 is a shift map.

FIG. 3 shows the shift map stored in the memory device 122. The transmission controller 12 controls the variator 20, the sub-transmission mechanism 30 and the lock-up clutch 2a according to operating conditions of the vehicle (in this embodiment, vehicle speed VSP, primary rotation speed Npri, accelerator pedal opening APO) while referring to this shift map.

In this shift map, an operating point of the transmission 4 is defined by the vehicle speed VSP and the primary rotation speed Npri. The inclination of a line connecting the operating point of the transmission 4 and a zero point at the lower left corner of the shift map corresponds to the speed ratio of the transmission 4 (overall speed ratio obtained by multiplying the speed ratio of the variator 20 by a speed ratio of the sub-transmission mechanism 30, hereinafter, referred to as a "through speed ratio"). In the shift map, a shift line is set for each accelerator pedal opening APO similarly to a shift map of a conventional belt-type continuously variable transmission, and the transmission 4 is shifted in accordance with the shift line selected according to the accelerator pedal opening APO.

When being in the low-speed mode, the transmission 4 can be shifted between a low-speed mode lowest line obtained by setting the speed ratio of the variator 20 to the lowest speed ratio and a low-speed mode highest line obtained by setting the speed ratio of the variator 20 to the highest speed ratio (areas A and B in FIG. 3). On the other hand, when being in the high-speed mode, the transmission 4 can be shifted between a high-speed mode lowest line obtained by setting the speed ratio of the variator 20 to the lowest speed ratio and a high-speed mode highest line obtained by setting the speed ratio of the variator 20 to the highest speed ratio (areas B and C in FIG. 3).

Further, on this map, a 1-2 shift line for determining an upshift of the sub-transmission mechanism 30 from the first gear position to the second gear position is so set as to overlap the low-speed mode highest line. If a targeted operating point of the transmission 4 crosses the 1-2 shift line from the area B side to the area C side, the transmission controller 12 upshifts the sub-transmission mechanism 30 from the first gear position to the second gear position.

The sub-transmission mechanism 30 is downshifted from the second gear position to the first gear position only in a situation where a large drive force is required. In this way, a shift frequency of the sub-transmission mechanism 30 is reduced and a reduction in drivability due to the repeated occurrence of a shift shock and a reduction in the durability of frictional engagement elements of the sub-transmission mechanism are suppressed.

Figure 4:
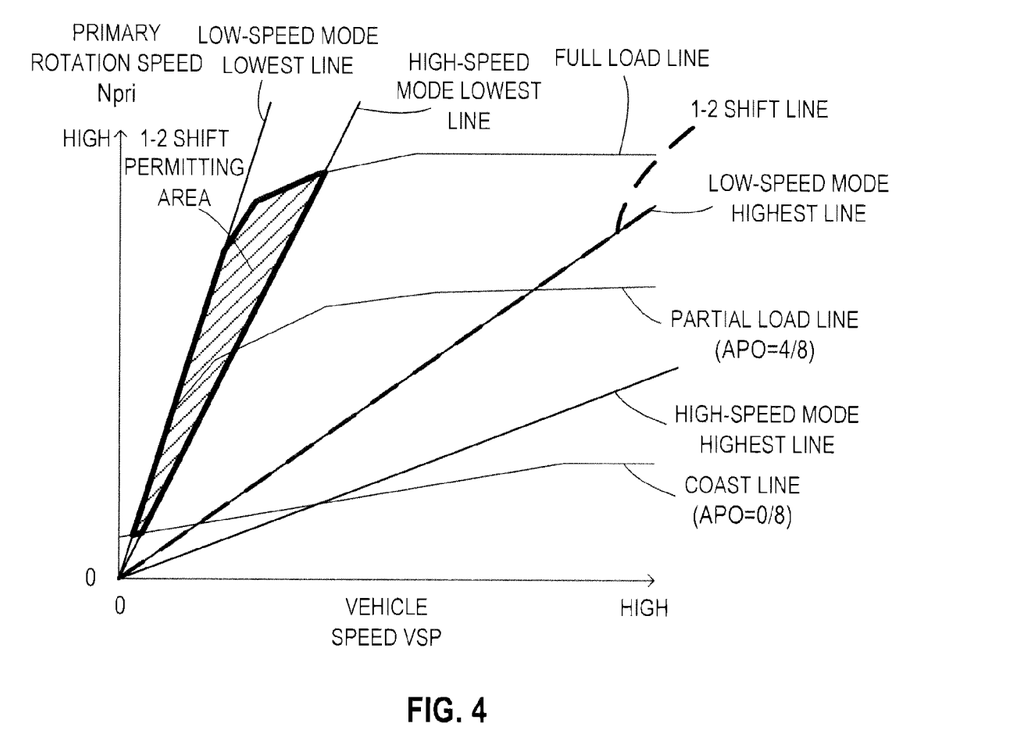
FIG. 4 is a map for determining a 2-1 shift permitting area.
Figure 5:
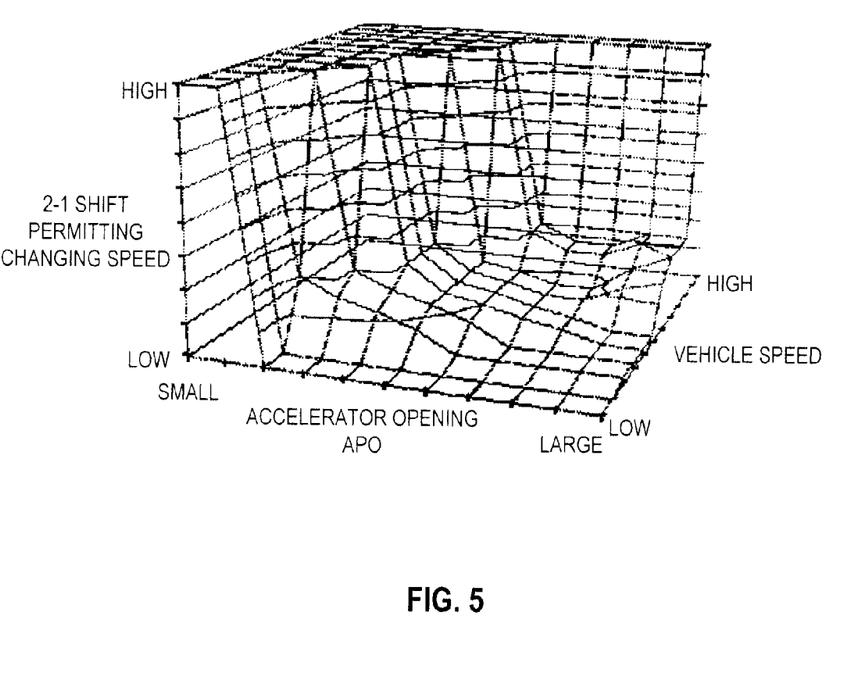
FIG. 5 is a map for setting a 2-1 shift permitting changing speed.

Specifically, the transmission controller 12 sets a 2-1 shift permitting area in the shift map as shown in FIG. 4 and downshifts the sub-transmission mechanism 30 from the second gear position to the first gear position, assuming that a large drive force is required, when the targeted operating point of the transmission 4 is in the 2-1 shift permitting area and a changing speed of the accelerator pedal opening APO is higher than a 2-1 shift permitting changing speed obtained by retrieving a map shown in FIG. 5.

However, the transmission controller 12 does not downshift the sub-transmission mechanism 30 when a torque change rate of the engine 1 is small even if the targeted operating point of the transmission 4 is in the 2-1 shift permitting area and the changing speed of the accelerator pedal opening APO is higher than the 2-1 shift permitting changing speed. This is to prevent the occurrence of a so-called draw-shock due to an inertia of the engine 1 when the sub-transmission mechanism 30 is downshifted from the second gear position to the first gear position.

Figure 6:
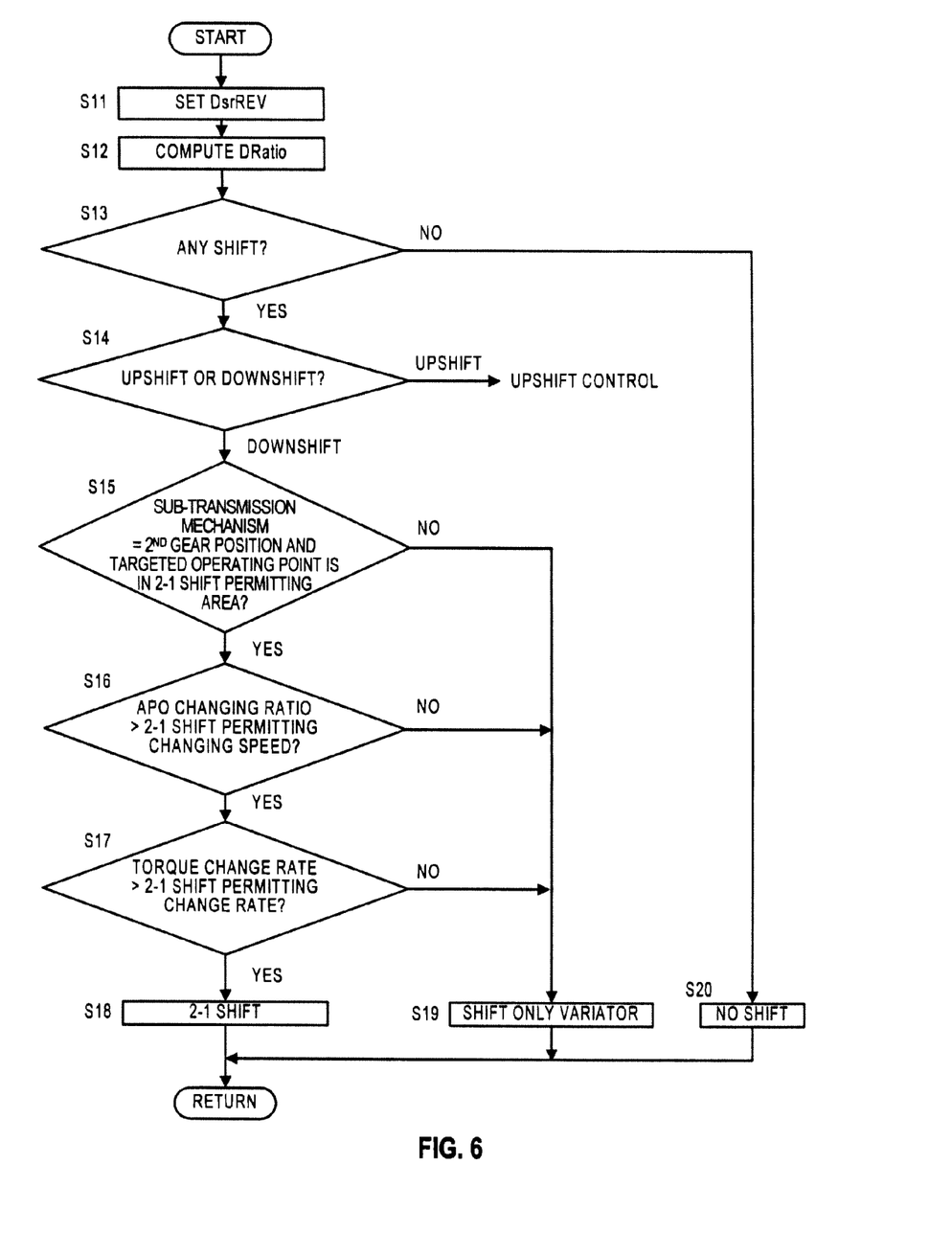
FIG. 6 is a flow chart showing the content of a shift control program to be executed to the transmission controller.

FIG. 6 shows the content of the shift control program stored in the memory device 122 of the transmission controller 12. With reference to this, the content of a shift control executed by the transmission controller 12 is described.

In S11, the transmission controller 12 retrieves an operating point (targeted operating point of the transmission 4) corresponding to the current vehicle speed VSP and accelerator pedal opening APO from the shift map shown in FIG. 3 and sets the primary rotation speed corresponding to this as a destination primary rotation speed DsrREV. The destination primary rotation speed DsrREV is a primary rotation speed which should be achieved at the current vehicle speed VSP and accelerator pedal opening APO and a target value of the primary rotation speed.

In S12, the transmission controller 12 computes a destination through speed ratio DRatio by dividing the destination primary rotation speed DsrREV by the vehicle speed VSP and a speed reduction ratio fRatio of the second gear train 5. The destination through speed ratio DRatio is a through speed ratio which should be achieved at the current vehicle speed VSP and accelerator pedal opening APO and a target value of the through speed ratio.

In S13, the transmission controller 12 compares the destination through speed ratio DRatio and an actual through speed ratio Ratio and determines whether or not any shift is to be performed. The process proceeds to S14 if two values differ and the shift is determined to be performed while proceeding to S20 if the shift is determined not to be performed.

In S14, the transmission controller 12 determines whether the shift to be performed next is an upshift or a downshift based on a relationship in magnitude between the destination through speed ratio DRatio and the actual through speed ratio Ratio.

If the shift to be performed next is determined to an upshift, the transmission controller 12 executes an upshift control by an unillustrated process. In the upshift control, the transmission controller 12 shifts the variator 20 to realize the destination through speed ratio DRatio and upshifts the sub-transmission mechanism 30 from the first gear position to the second gear position when the targeted operating point of the transmission 4 crosses the 1-2 shift line.

The process proceeds to S15 if the shift to be performed next is determined to be a downshift.

In S15, the transmission controller 12 determines whether or not the gear position of the sub-transmission mechanism 30 is the second gear position and the targeted operating point of the transmission 4 is located in the 2-1 shift permitting area shown in FIG. 4. The 2-1 shift permitting area is an area where the accelerator pedal opening APO is large, a large drive force is required and the sub-transmission mechanism 30 needs to be shifted to the first gear position to realize the through speed ratio of this area. The process proceeds to S16 if an affirmative determination is made while proceeding to S19 if a negative determination is made.

In S16, the transmission controller 12 retrieves the map of FIG. 5, sets the 2-1 shift permitting changing speed corresponding to the accelerator pedal opening APO and the vehicle speed VSP and determines whether or not the changing speed of the accelerator pedal opening APO is higher than the 2-1 shift permitting changing speed. The 2-1 shift permitting changing speed is a threshold value for determining a situation where a large drive force is required. The process proceeds to S17 if an affirmative determination is made while proceeding to S19 if a negative determination is made.

In S17, the transmission controller 12 determines whether or not a torque change rate of the engine 1 is larger than a 2-1 shift permitting change rate (predetermined low change rate). The torque change rate of the engine 1 can be obtained by retrieving values corresponding to the accelerator pedal opening APO and the engine rotation speed Ne from a predetermined engine torque map and computing a change rate thereof. The 2-1 shift permitting change rate is set at a lower limit value of the torque change rate at which a phenomenon in which a torque decreases due to an inertia does not occur when the sub-transmission mechanism 30 is downshifted from the second gear position to the first gear position, i.e. at a lower limit value of the torque change rate at which a draw-shock does not occur. The process proceeds to S18 if an affirmative determination is made while proceeding to S19 if a negative determination is made.

In S18, the transmission controller 12 downshifts the sub-transmission mechanism 30 from the second gear position to the first gear position. Further, the transmission controller 12 shifts the variator 20 so that the destination through speed ratio DRatio is realized.

In S19 proceeded to if a negative determination is made in S15 to S17, the transmission controller 12 shifts only the variator 20 so that the actual through speed ratio Ratio of the transmission 4 approaches the destination through speed ratio DRatio. If the destination through speed ratio DRatio cannot be achieved only by shifting the variator 20 since the sub-transmission mechanism 30 is in the second gear position, the variator 20 is shifted to a lowest speed ratio.

Since the shift is not necessary if the process proceeds to S20, the transmission controller 12 shifts neither the variator 20 nor the sub-transmission mechanism 30.

Thus, according to the above shift control, the sub-transmission mechanism 30 is normally downshifted (S18) if the targeted operating point of the transmission 4 is in the 2-1 shift permitting area and the changing speed of the accelerator pedal opening APO is higher than the 2-1 shift permitting changing speed, but the sub-transmission mechanism 30 is not downshifted and only the variator 20 is shifted (S19) if the torque change rate of the engine 1 is smaller than the 2-1 shift permitting change rate.

For example, if the accelerator pedal is slowly depressed, the targeted operating point of the transmission 4 enters the 2-1 shift permitting area and the accelerator pedal is quickly depressed when a change of the torque of the engine 1 with respect to the accelerator pedal opening APO is small (e.g. accelerator is nearly fully open), the sub-transmission mechanism 30 is not downshifted since a negative determination is made even if an affirmative determination is made in S15, S16.

As just described, the occurrence of a draw-shock caused by downshifting the sub-transmission mechanism 30 when the torque change rate of the engine 1 is small can be suppressed by restricting the downshift of the sub-transmission mechanism 30 when the torque change rate is small.

Although the embodiment of the present invention has been described above, the above embodiment is merely one application example of the present invention and not of the nature to limit the technical scope of the prevent invention to the specific configuration of the above embodiment.

Further, although the 2-1 shift permitting area is set to be an area enclosed by the low-speed mode lowest line, the high-speed mode lowest line, the full load line and the coast line, this is an example. The 2-1 shift permitting area can be set to be an area different from this.

Further, although the power source is the engine 1 in the above embodiment, it may be a combination of the engine 1 and a motor or solely a motor.

The present application claims a priority of Japanese Patent Application No. 2012-213939 filed with the Japan Patent Office on Sep. 27, 2012, all the contents of which are hereby incorporated by reference.

The invention claimed is:

1. A continuously variable transmission with a variator capable of continuously changing a speed ratio and a stepped sub-transmission mechanism for shifting and outputting output ration of a power source, comprising:
   a downshift determining unit configured to determine whether or not to downshift the sub-transmission mechanism based on an opening and an opening speed of an accelerator pedal, which is an output adjusting device of the power source, and a torque change rate of the power source; and
   a shifting unit configured to downshift the sub-transmission mechanism when a determination is made to downshift the sub-transmission mechanism.

2. The continuously variable transmission according to claim 1, wherein:
   the downshift determining unit determines not to downshift the sub-transmission mechanism regardless of values of the opening and the opening speed of the accelerator pedal if the torque change rate of the power source is smaller than a predetermined low change rate.

3. A control method for a continuously variable transmission with a variator capable of continuously changing a speed ratio and a stepped sub-transmission mechanism for shifting and outputting output ration of a power source, comprising:
   determining whether or not to downshift the sub-transmission mechanism based on an opening and an opening speed of an accelerator pedal, which is an output adjusting device of the power source, and a torque change rate of the power source; and
   downshifting the sub-transmission mechanism when a determination is made to downshift the sub-transmission mechanism.

4. A continuously variable transmission with a variator capable of continuously changing a speed ratio and a stepped sub-transmission mechanism for shifting and outputting output ration of a power source, comprising:
   downshift determining means for determining whether or not to downshift the sub-transmission mechanism based on an opening and an opening speed of an accelerator pedal, which is an output adjusting device of the power source, and a torque change rate of the power source; and
   shifting means for downshifting the sub-transmission mechanism when a determination is made to downshift the sub-transmission mechanism.

* * * * *